July 10, 1928.  
H. J. MURPHY  
LUBRICATING APPARATUS  
Filed Aug. 25, 1925  
1,676,457
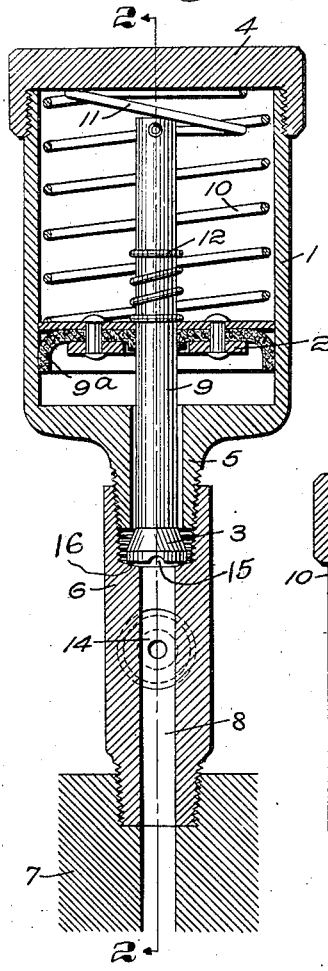
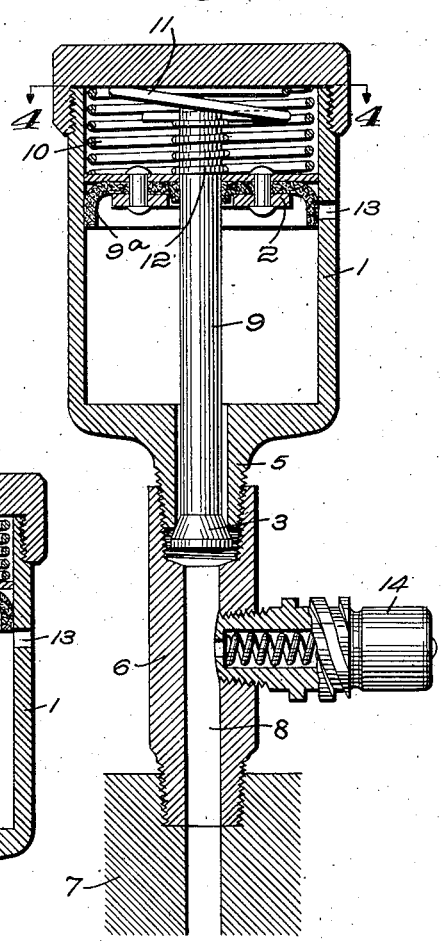
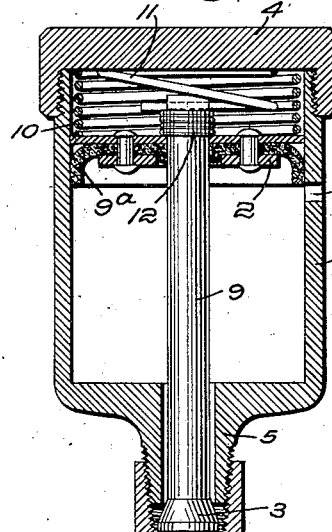
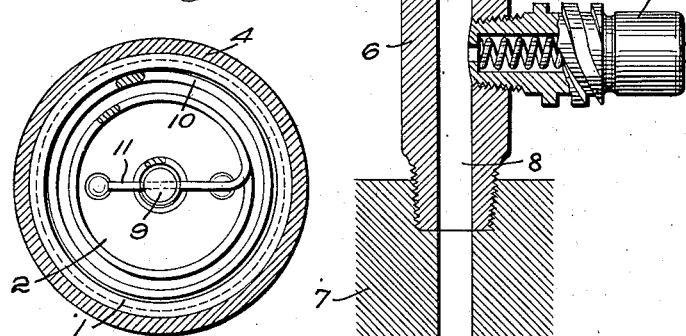
Inventor:
Howard J. Murphy,
by Emery Booth Janney - Varney
Attys.

Patented July 10, 1928.

1,676,457

UNITED STATES PATENT OFFICE.

HOWARD J. MURPHY, OF READING, MASSACHUSETTS, ASSIGNOR, BY MESNE ASSIGN-MENTS, TO THE BASSICK MANUFACTURING COMPANY, OF CHICAGO, ILLINOIS, A CORPORATION OF DELAWARE.

LUBRICATING APPARATUS.

Application filed August 25, 1925. Serial No. 52,403.

This invention aims to provide improvements in lubricating apparatus and more particularly though not exclusively for improvements in lubricant supply cups.

In the drawings, which illustrate a preferred embodiment of my invention:—

Figure 1 is a vertical section through a lubricant supply cup and a portion of a bearing showing the relation of the working parts of the cup when lubricant is being expelled therefrom, Figure 2 is a section on the line 2—2 of Fig. 1 showing the valve closed and the cup filled with lubricant.

Figure 3 is a section similar to Fig. 2 but showing the relation of the parts of the cup when the valve fails to close during the filling operation and Figure 4 is a section on the line 4—4 of Fig. 2.

Referring to the drawings, I have illustrated a slow feed lubricant supply cup which is particularly, though not exclusively, useful for lubricating a bearing of an automobile.

The cup illustrated includes a cylinder 1, which provides a reservoir, a piston 2 in said cylinder, a valve 3 adjacent to the discharge end of said cylinder and a removable cover 4, to permit access to the parts located within the cylinder 1. The discharge end of the cylinder is provided with a boss 5 to which is threadedly secured a part 6 which is also connected, at its opposite end, to a bearing 7. A discharge passage 8 for the lubricant leads directly from the reservoir through the boss 5 and part 6 and the valve 3 is located between the end of the boss 5 and part 6, the end of the boss providing the seat for the valve.

The part 6 when associated with the boss 5 provides a stop 16 for the valve 3, limiting the opening or downward motion of said valve. The lower or non-seating portion of the valve 3 should preferably be so formed that it will not close the passage 8 when the valve is in open position, as shown in Figure 1. One method of accomplishing this result is by providing the lower surface of the valve 3 with a groove 15, which permits the valve 3 to rest upon the stop 16 without closing the passage 8. It will be obvious to those skilled in the art that any method of shaping the passage 8 and lower surface of the valve 3 which will permit the lubricant to flow past the valve when the valve is open, will accomplish the same result, and I do not wish to limit myself to the construction shown.

The valve 3 presents a stem 9 of relatively smaller cross-sectional area than the cross-sectional area of the discharge passage 8, the stem passing through the discharge passage and extending substantially to the top of the reservoir.

The piston 2 surrounds the stem 9 and is slidable relative thereto, while the flexible washer 9ª which forms a part of the piston 2 is a combination of a cup leather and hat washer, the hat washer portion providing a seal around the stem 9.

A plurality of coil springs are interposed between the piston 2 and the cover 4 for operation of the valve 3 and the piston 2. A large coil spring 10 presses the piston toward the discharge end of the cup, a light pressure spring 11 seats against the cover and has one end passing through the upper end of the stem 9 of the valve and a small spring 12, relatively stronger than the spring 11, is interposed between the piston 2 and the end of the spring 11 which passes through the stem 9. This spring 12 permits the piston 2 to pass above the vent 13 located in the wall of the cylinder 1, the purpose of which will be more fully hereinafter described.

A lubricant receiving nipple 14 is secured to the part 6 to permit filling the cup from a source of lubricant under pressure.

Assuming the cup to be empty the piston 2 will be at the discharge end of the reservoir and the valve 3 will be held open by the spring 11 substantially as illustrated in Fig. 1. The reservoir may be easily and quickly filled with lubricant by connecting a source of lubricant under pressure to the nipple 14. The lubricant will flow through the nipple 14, through the discharge passage 8 past the valve 3 and into the reservoir, where it will act upon the piston 2 to compress the spring 10 and force the piston upwardly in the cylinder 1 until the spring 12 engages the end of the spring 11, which compresses upon further movement of the piston, thereby closing the valve 3 as illustrated in Fig. 2. After the valve closes the lubricant flows directly to the bearing and sufficient pressure may be exerted upon the lubricant to free the bearing of all dirt or hardened lubricant. Thus, each time that the reservoir is filled the bearing may be flushed.

It will be obvious to those skilled in the art that during the operation of charging the reservoir 1, only sufficient pressure need be exerted on the lubricant to overcome the flow resistance of the lubricant and to compress that portion of the spring 10 which is tensioned between the piston 2 and the cap 4. The force exerted by the spring 11 on the valve 3 must, of course, be greater than the resultant thrust of the lubricant upon the bottom of the valve 8.

If for any reason the valve 3 fails to close, during the filling operation, the spring 12 may be compressed to allow the piston to pass the vent 13 thereby permitting the lubricant to leak out of the reservoir to indicate that the valve has not closed and that the cup is filled with lubricant. This arrangement also prevents bursting of the cup by excessive pressure of the lubricant when the valve fails to close, as best illustrated in Fig. 3.

After the supply has been disconnected from the nipple 14 the spring 11 acts upon the stem 9 to open the valve 3 and thereafter the spring 10 acts upon the piston to slowly feed the lubricant from the reservoir to the bearing. The friction created between the piston 2 on the inside wall of the cylinder 1 and the stem 9 retards the movement of the piston to such a degree that the lubricant is fed very slowly to the bearing, thereby preventing wastage of the lubricant.

While I have shown and described a preferred embodiment of my invention it will be understood that changes involving omission, substitution, alteration and reversal of parts and even changes in the mode of operation may be made without departing from the scope of my invention, which is best defined in the appending claims.

Claims:

1. A lubricant supply cup comprising a reservoir, a spring pressed closure valve normally permitting passage of lubricant from said reservoir, lubricant expelling means in said reservoir movable relative to said valve for slowly forcing the lubricant therefrom, resilient means interposed between the valve, the cup, and the lubricant expelling means, adapted to be compressed by the pressure of the lubricant entering said cup and acting upon said lubricant expelling means to permit filling said cup through said valve and to close said valve when said cup is filled to a predetermined level.

2. A lubricant supply cup comprising a reservoir, a spring pressed closure valve normally permitting passage of lubricant from said reservoir, a nipple secured to said cup to permit filling of said cup from a source of lubricant under pressure and to permit direct passage of lubricant from the source of lubricant under pressure to a bearing after said cup has been filled, a spring pressed piston for slowly forcing the lubricant from said reservoir, and spring means for controlling operation of said valve, said cup having a vent in its wall, said spring means also permitting said piston to be forced past said vent when said valve fails to close.

3. A slow feed lubricant cup comprising a supply reservoir having a discharge passage leading from one end thereof, a closure valve in said discharge passage, a stem extending from said valve into said reservoir, a spring having one end thereof secured to said stem to normally hold said valve in open position, and a piston slidable relative to said stem in said reservoir for forcing lubricant therefrom and for compressing said spring to close said valve when said reservoir is filled with lubricant through said discharge passage.

4. A slow feed lubricant cup comprising a supply reservoir having a discharge passage leading from one end thereof to a bearing, a lubricant receiving nipple communicating with said discharge passage, a closure valve in said discharge passage having a stem extending into said reservoir, a spring normally urging said valve open and a spring actuated lubricant expelling piston slidable relative to said stem to act upon said spring and close said valve after the lubricant has reached a predetermined level in said reservoir, thereby to prevent further flow of lubricant through said nipple into said reservoir while permitting flow of lubricant under high pressure to the bearing.

5. A slow feed lubricant cup comprising a supply reservoir having a vent in the wall thereof, and a discharge passage leading from one end of said reservoir to a bearing, a lubricant receiving nipple communicating with said discharge passage, a closure valve in said discharge passage having a stem extending into said reservoir, a relatively weak spring normally maintaining said valve in open position, a spring actuated lubricant expelling piston slidable upon said stem, and a spring surrounding said stem, said vent being located above the normal level to which said reservoir is filled, to provide an escape for lubricant which may be forced to said cup by failure of said valve to close at the proper time.

6. A slow feed lubricant cup comprising a supply reservoir having a discharge passage leading from one end thereof to a bearing, a lubricant receiving nipple communicating with said discharge passage, a closure valve in said discharge passage, a piston in said reservoir reciprocal relative to said valve to force lubricant from said reservoir, resilient means co-operating with said valve and said piston to close said valve when said piston reaches a predetermined level when lubricant is being fed into said cup through said nipple, said cup having a vent in the wall thereof, said resilient means permitting said piston to pass said vent to permit escape of lubricant if said valve fails to close.

7. A slow feed lubricant cup comprising a reservoir having a discharge passage leading therefrom, a closure valve in said discharge passage having a stem extending a substantial distance into said reservoir, a nipple communicating with the discharge passage through which the reservoir may be filled, a piston slidable relative to said stem in said reservoir, a spring constantly urging said piston toward said discharge passage, a relatively weak spring for normally opening said valve, a third spring relatively stronger than said weak spring between said piston and said weak spring and said cup having a vent in the wall thereof, said weak spring adapted to be compressed by the pressure of the lubricant acting through said piston to close said valve when the lubricant reaches a predetermined level during the filling operation, thereby to permit passage of lubricant from a supply under pressure through said nipple and through said discharge passage directly to a bearing.

8. A slow feed lubricant cup comprising a reservoir having a discharge passage leading therefrom, a closure valve in said discharge passage having a stem extending a substantial distance into said reservoir, a nipple communicating with the discharge passage through which the reservoir may be filled, a piston slidable relative to said stem in said reservoir, a spring constantly urging said piston toward said discharge passage, a relatively weak spring for normally opening said valve, a third spring relatively stronger than said weak spring between said piston and said weak spring, said cup having a vent in the wall thereof, said weak spring adapted to be compressed by the pressure of the lubricant acting through said piston to close said valve when the lubricant reaches a predetermined level during the filling operation, and said third spring adapted to be compressed thereafter to permit said piston to uncover said vent if said valve fails to close.

In testimony whereof, I have signed my name to this specification.

HOWARD J. MURPHY.